United States Patent
Fahrni et al.

(10) Patent No.: US 11,583,951 B2
(45) Date of Patent: Feb. 21, 2023

(54) METHOD FOR COLLISION AVOIDANCE AND LASER MACHINING TOOL

(71) Applicant: BYSTRONIC LASER AG, Niederönz (CH)

(72) Inventors: Christoph Fahrni, Oberönz (CH); Seyed Amin Mazloumian, Zürich (CH)

(73) Assignee: BYSTRONIC LASER AG, Niederoenz (CH)

( * ) Notice: Subject to any disclaimer, the term of this patent is extended or adjusted under 35 U.S.C. 154(b) by 0 days.

(21) Appl. No.: 17/275,042

(22) PCT Filed: Sep. 23, 2019

(86) PCT No.: PCT/EP2019/075456
§ 371 (c)(1),
(2) Date: Mar. 10, 2021

(87) PCT Pub. No.: WO2020/064589
PCT Pub. Date: Apr. 2, 2020

(65) Prior Publication Data
US 2021/0245295 A1     Aug. 12, 2021

(30) Foreign Application Priority Data
Sep. 24, 2018   (DE) ............................. 102018123363

(51) Int. Cl.
*B23K 26/03*     (2006.01)
*B23K 26/38*     (2014.01)
*G05B 19/4061*   (2006.01)

(52) U.S. Cl.
CPC ............ *B23K 26/032* (2013.01); *B23K 26/38* (2013.01); *G05B 19/4061* (2013.01); *G05B 2219/35316* (2013.01); *G05B 2219/37555* (2013.01)

(58) Field of Classification Search
CPC .. B23K 26/032; B23K 26/38; G05B 19/4061; G05B 2219/37555; G05B 2219/35316
(Continued)

(56) References Cited

U.S. PATENT DOCUMENTS 4,613,269 A * 9/1986 Wilder ................... B25J 9/1697
                                                348/92
4,618,938 A * 10/1986 Sandland ................ G06T 7/001
                                                348/126
(Continued)

FOREIGN PATENT DOCUMENTS

WO    WO-2020064589 A1 *  4/2020 ........... B23K 26/032

OTHER PUBLICATIONS

International Preliminary Report on Patentability, dated Sep. 10, 2020, for PCT/EP2019/075456 filed Sep. 23, 2019.

*Primary Examiner* — Jimmy Chou
(74) *Attorney, Agent, or Firm* — Workman Nydegger

(57) ABSTRACT

The invention relates to a method for collision avoidance of a laser machining head (102) in a machining space (106) of a laser machining tool (100), having the steps of: —Monitoring a workpiece (112) in the machining space (106) with at least one optical sensor; —Capturing images of the workpiece (112); —Detecting a change in an image of the workpiece (112); —Recognising whether the change comprises an object standing upright relative to the workpiece (112); —Checking for a collision between the upright object and the laser machining head (102) based on a predetermined cutting plan and/or the current position (1016) of the laser machining head; —Controlling the drives for moving the laser machining head (102) for collision avoidance in case of recognised risk of collision.

15 Claims, 6 Drawing Sheets

(58) Field of Classification Search
USPC .............. 219/121.78, 121.79, 121.8, 121.81, 219/121.82, 121.83, 121.69
See application file for complete search history.

(56) References Cited

U.S. PATENT DOCUMENTS

| | | | | | |
|---|---|---|---|---|---|
| 4,667,113 | A * | 5/1987 | Nakajima | ............. | B23B 49/001 250/559.08 |
| 4,794,222 | A * | 12/1988 | Funayama | ........... | B23K 26/048 219/121.74 |
| 5,359,872 | A * | 11/1994 | Nashiki | ................... | B21D 5/00 72/21.4 |
| 5,387,061 | A * | 2/1995 | Barkman | ............... | B23Q 17/24 318/568.1 |
| 5,489,758 | A * | 2/1996 | Nihei | .................. | B23K 26/046 219/121.63 |
| 5,751,584 | A * | 5/1998 | Yuasa | ................ | G05B 19/4061 700/166 |
| 5,864,114 | A * | 1/1999 | Fukuda | ................ | B08B 7/0042 219/121.83 |
| 6,084,223 | A * | 7/2000 | Dietz | ................... | B23K 26/032 219/121.64 |
| 6,128,546 | A * | 10/2000 | Basista | .............. | G05B 19/4205 700/173 |
| 6,353,203 | B1 * | 3/2002 | Hokodate | .......... | B23K 26/0648 219/121.67 |
| 6,603,136 | B1 * | 8/2003 | Wagner | ................ | B23K 26/04 219/121.78 |
| 6,617,541 | B1 * | 9/2003 | Wadman | ................ | B23K 26/18 349/139 |
| 6,632,053 | B2 * | 10/2003 | Koch | ................ | G05B 19/4099 409/132 |
| 7,062,351 | B2 * | 6/2006 | Wampler | ........... | G05B 19/4069 700/178 |
| 7,283,892 | B1 * | 10/2007 | Boillot | ................... | G01S 15/08 219/121.61 |
| 7,638,731 | B2 * | 12/2009 | Kosmowski | ........... | B23K 26/04 219/121.68 |
| 7,764,039 | B2 * | 7/2010 | Yamaguchi | ........ | G05B 19/4061 318/569 |
| 8,175,858 | B2 * | 5/2012 | Naganawa | ......... | G05B 19/4069 703/7 |
| 8,367,969 | B2 * | 2/2013 | Caristan | ................ | B23K 26/38 219/121.67 |
| 8,382,087 | B2 * | 2/2013 | Kilian | .................. | B23K 26/702 269/296 |
| 8,581,144 | B2 * | 11/2013 | Furuta | ................. | B23K 26/046 219/121.75 |
| 8,987,634 | B2 * | 3/2015 | Pieger | .................. | B23K 26/342 219/121.84 |
| 9,110,459 | B2 * | 8/2015 | Matsumoto | ........ | G05B 19/4061 |
| 9,122,267 | B2 * | 9/2015 | Morita | ............... | G05B 19/4061 |
| 9,539,664 | B2 * | 1/2017 | Fagan | .................. | B23K 26/046 |
| 10,507,558 | B2 * | 12/2019 | Inaba | .................... | B23Q 15/22 |
| 2003/0209528 | A1 * | 11/2003 | Choo | ................. | B23K 26/0884 219/121.72 |
| 2004/0112880 | A1 * | 6/2004 | Sekiya | ................ | B23K 26/364 219/121.69 |
| 2005/0010324 | A1 * | 1/2005 | Kaever | ............. | G05B 19/4061 700/178 |
| 2005/0226377 | A1 * | 10/2005 | Wong | ....................... | A61N 5/10 378/65 |
| 2007/0228025 | A1 * | 10/2007 | Horn | ................. | B23K 26/1476 219/121.78 |
| 2009/0127762 | A1 * | 5/2009 | Kilian | ................ | B23K 37/0408 269/296 |
| 2010/0063617 | A1 * | 3/2010 | Mori | ...................... | B23Q 17/20 700/175 |
| 2010/0176099 | A1 * | 7/2010 | Hilderbrand | ......... | G05B 19/401 219/121.67 |
| 2011/0313561 | A1 * | 12/2011 | Lee | ....................... | G06T 7/0004 700/166 |
| 2012/0267349 | A1 * | 10/2012 | Berndl | ................. | B23K 26/046 219/121.65 |
| 2013/0319980 | A1 * | 12/2013 | Hesse | .................. | B23K 26/032 219/121.62 |
| 2014/0263211 | A1 * | 9/2014 | Hassan | ................ | B23K 26/361 219/121.69 |
| 2015/0151381 | A1 * | 6/2015 | Kurosawa | ............. | B23K 26/36 219/121.83 |
| 2015/0165549 | A1 * | 6/2015 | Beutler | ................ | B23K 26/032 219/121.83 |
| 2015/0266133 | A1 * | 9/2015 | Tokito | ................ | B23K 26/0892 219/121.82 |
| 2015/0352679 | A1 * | 12/2015 | Yamamoto | ........... | B23Q 17/007 73/865.8 |
| 2016/0059350 | A1 * | 3/2016 | Schoenleber | ...... | G01B 9/02091 219/121.81 |
| 2016/0059351 | A1 * | 3/2016 | Miyashita | ............ | B23K 26/048 219/121.81 |
| 2016/0158884 | A1 * | 6/2016 | Hagenlocher | ........ | B23K 26/042 219/121.85 |
| 2016/0184923 | A1 * | 6/2016 | Tokito | .................. | B23K 26/048 219/121.81 |
| 2016/0193692 | A1 * | 7/2016 | Regaard | ............. | B23K 26/0626 219/121.62 |
| 2017/0115656 | A1 * | 4/2017 | Ottnad | ............... | B23K 26/1464 |
| 2019/0128857 | A1 * | 5/2019 | Hiramatsu | ....... | G01N 35/00584 |

\* cited by examiner

METHOD FOR COLLISION AVOIDANCE AND LASER MACHINING TOOL

The invention relates to a method for collision avoidance of a laser machining head and a numerically controlled laser machining tool. In particular, the invention relates to a method for collision avoidance according to claim 1 and a numerically controlled laser machining tool according to claim 12.

A laser cutting machine separates flat sheets or pipes resting on a cutting grid with a laser beam. Due to pressure surges of the cutting gas or thermal stresses as well as unfavourable points of support on the grate, cut parts can tip over and block the cutting head. It is also possible that the cut parts are completely released from the residual material and flung through the interior of the machine. The following approaches to crash prevention in laser cutting machines are already being used.

Leaving micro-bridges: The outer contour of small parts is not completely cut. The parts are still attached at small bridges. At the end of the machining, the parts must be completely cut out or broken out in a further step.

The provision of an intelligent cutting contour: The cutting head is not moved over already cut parts. This leads to more complex and longer-lasting movement patterns.

The fragmentation of inner contours: The waste pieces are crushed in advance so that they fall between the support points and cannot erect. This increases the energy consumption as well as the machining time.

The use of high-quality raw material: The use of high-quality raw materials can reduce the thermal expansion, but not the other sources of error.

However, these approaches lead only to unsatisfactory results and do not achieve the desired reliability.

The object of the invention is to avoid the disadvantages of the prior art and to provide an improved laser machining tool. Alternative objects are to provide an improved method for collision avoidance or an improved laser machining tool.

This object is achieved by a method according to claim 1 or a numerically controlled laser machining tool according to claim 12.

The method according to the invention for collision avoidance of a laser machining head in a machining space of a laser machining tool comprises the steps:
Monitoring a workpiece in the machining space with at least one optical sensor;
Capturing images of the workpiece;
Detecting a change in an image of the workpiece;
Recognising whether the change comprises an object that stands upright relative to the workpiece;
Checking for a collision between the upright object and the laser machining head based on a predetermined cutting plan and/or the current position of the laser machining head;
Controlling the drives for moving the laser machining head to avoid collision in case of recognised risk of collision.

To avoid collisions between the cutting head and the workpieces which lead to repairs and downtime of the machine, the collision avoidance method according to the invention proposes that the interior of the machine be monitored with at least one sensor. Suitable sensors are, for example, cameras, such as ToF (time-of-flight) cameras or CCD/CMOS cameras—preferably CMOS cameras. The live data from the sensors are used to recognise an upright object, such as a cut part that has tilted or flown away. The combination of the planned track of the cutting head and the upright object recorded by the sensors makes it possible to recognise collisions early. If such an event occurs, the machine will stop or, for example, bypass the critical point by raising the Z axis. For example, the one camera can comprise a dual sensor or stereo sensor to produce images from different angles or perspectives. These images can be recorded simultaneously or in quick succession, for example with a time interval of less than one second. Likewise, it is possible for a camera or lens to be spatially moved to produce images from different angles or perspectives that provide information for depth representation or depth recognition. Multiple cameras can also be used. One or more changes in an image of the workpiece relative to a chronologically earlier image of the workpiece are detected. The chronologically earlier image can be the direct predecessor of the image. The image, in turn, later becomes the chronologically earlier image for a successor.

The collision avoidance method according to the invention has further advantages in addition to the recognition of potential collisions and the prevention of collisions. Thus, a visualisation of the cutting area for the operator can result. In addition, the condition of the grid and table and the workpiece position, the workpiece size, and damage can be determined.

It can be provided that measuring points are defined along a cutting contour of a cut part and monitored for brightness and/or colour values. This arrangement of measurement points enables the use of very efficient algorithms such as the colour-along-edges algorithm. The number and exact arrangement of the measuring points can be adapted to the circumstances, such as the geometry of the part to be cut, the cutting speed, the material thickness, or the like. All or some sides, such as only one of two opposite sides, can be provided with measurement points.

It can further be provided that the images are captured offset in time and that a change in an image of the workpiece is detected relative to a chronologically earlier image of the workpiece. This enables fast image processing.

It can be provided that a 3D object of the change is modelled and that the collision between the 3D object and the laser machining head is checked. The live data from the sensors are used to continuously track a 3D model of the cutting area. The combination of the planned track of the cutting head and the 3D topology recorded and calculated by the sensors makes it possible to recognise collisions early.

The method may include the further steps:
Calculating at least two shapes consisting of points and located parallel to a border of a cutting contour in an image, wherein one shape is located inside the border and one shape is located outside the border;
Extracting image pixels according to the points of the shapes;
Normalizing the image pixels by calculating a histogram of pixel brightness for each shape;
Inputting the histograms into a deep neural network comprising an input layer, a plurality of internal layers and an output layer;
Processing the histograms with the deep neural network;
Outputting a variable by the deep neural network; and
Recognizing whether an object in the cutting contour is tilted for a value of the variable being on a first side of a threshold or whether an object in the cutting contour is not tilted for a value of the variable being on a second side of a threshold.

Such approach runs very quickly, thereby reducing reaction times. The two shapes comprise or consist of a trace of points inside or outside the cutting contour. The offset to the cutting contour may be in the range of two to ten mm, preferably 5 mm. It is also possible to use more than two shapes, e. g. two shapes inside and two shapes outside the cutting contour. Further, a reference image of the part or workpiece before cutting may be implemented as a further shape. A cutting plan may be projected onto the image to define the cutting contours.

By calculating a histogram of pixel brightness the image pixels are normalized. The brightness of a pixel is dependent from the reflection of light at that pixel and is an indicator for the orientation or angle of the part on which the pixel is located. Reflection values may reach from dark/black (cut part absent or tilted) to bright/white (full reflection). For example gray scale values from 0 to 256 may be binned. Each histogram may have between 12 and 64, preferably 32 bins, i.e. brightness values. The bins may have the same brightness range or have different sizes or ranges for adapting the resolution or brightness distribution. Normalizing by a histogram results in the same amount of pre-processed data regardless of the shape and the size of any contour. By reducing any number of pixels in a shape to a histogram with for example only 32 values, any information about the size or shape of the contour becomes irrelevant. Further, processing of such data with a Neural network is improved as all histograms have the same size, i.e. the numbers of bins.

Before inputting the histograms into a deep neural network this input data of histograms may be concatenated into a vector. The size of the vector may differs for the number of used cameras. For example, the size of the vector differs for two cameras and for one camera. For more than one camera, the vector includes histograms and optionally 2D or co-occurrence histograms from each camera.

The neural network may be a deep neural network consisting of one flattening layer as input layer, five internal dense layers with batch normalization and one dense layer with sigmoid activation as an output layer. The deep neural network or models may differ for the number of cameras only in the size of the input layer and in the number of coefficients. A model with at least two cameras, preferably two cameras, may be used. In cases where the cutting head is located between the cameras, the inference might be done with the camera that shows the complete contour.

The steps of outputting and recognizing may include:
Outputting, by the deep neural network, one floating point variable with a value in the range from 0,0 to 1,0 for the cutting contour; and
Recognizing whether an object in the cutting contour is tilted for a value of the floating point variable being 0.5 or above or whether an object in the cutting contour is not tilted for a value of the floating point variable below 0.5.

It can be provided that two further shapes are calculated, wherein a first further shape is located on the cutting contour and a second further shape covers the whole area inside the cutting contour. The points in the first further shape may be spaced very densely, like for example at three points per mm. The points in the further three shapes may be arranged sparser, like for example at two mm distance between two adjacent points. The distance between points may be calculated in mm in the image or in pixels of the image.

It can further be provided that before the step of extracting image pixels, it is determined which image pixels are not covered by parts of the laser machining tool, for the determination a dynamic 3D model of the parts of the laser machining tool is provided and updated with live coordinates from the laser machining tool, the visible, to be extracted, image pixels are calculated by comparison of the dynamic 3D model with the images. For using AI based on vision, it may be determined whether the contour is visible or covered by parts of the machine. For this purpose, a dynamic 3D model of the cutting machine consisting of bridge, support and cutting head may be implemented. The model may be updated with live coordinates, i.e. actual positions, velocities and/or accelerations, from the machine and then used to calculate which contours or parts of contours are visible. It may further be calculated which contours or parts of contours are visible from the utilized cameras, e. g. from both cameras, only from the left camera, only from the right camera or not at all.

It can be provided that the step of normalizing the image pixels further includes calculating a 2D histogram for the at least two shapes. Such 2D or co-occurrence histogram is calculated for shapes inside and outside of the cutting contour. This 2D histogram uses the multiplication of the bins for the histograms, e. g. 32 by 32 bins. The 2D histogram puts the brightness of corresponding points inside and outside of the cut in correlation to improve the processing along the cut lines.

It can further be provided that the recognition is based on already pre-calculated possible positions of cut parts of the workpiece. For this purpose, the contours of the cut parts, that is the parts to be cut out, are rotated and stored in possible positions. The rotation can take place about an axis, for example the vertical axis or z-axis, or also about several axes.

It can be provided that a cut part is identified and the position thereof compared with already calculated possible positions of this cut part. Then only a simple matching or comparison algorithm is required during the runtime or machining time, which saves time and thus makes the process faster.

It can also be provided that the laser machining head is driven to bypass the change or to stop. If no further bypassing is possible due to the speed, acceleration, and/or position of the laser machining head or the position of the change, that is an upright part of the workpiece or a separated part, a stop or emergency stop can be controlled to avoid a collision. If a collision is avoidable, the change is detoured around or bypassed. Then the laser machining head is driven accordingly.

The numerically controlled laser machining tool according to the invention with a machining space for receiving metallic workpieces to be machined and a laser machining head for machining the workpieces comprises
  a numerical control unit,
  an optical sensor system having at least one optical sensor which captures at least a part of the machining space and the workpiece arranged therein,
  a graphics processing unit connected to the optical sensor system and configured to process data from the sensor to recognise changes in the workpiece, and connected to the numerical control unit,
  wherein the graphics processing unit is configured to recognise whether a change comprises an upright object,
  wherein the graphics processing unit and/or the numerical control unit is configured to check for collision between the upright object and the laser machining head based on a predetermined cutting plan and/or the current position and/or the trajectory of the laser machining head, and
  wherein the numerical control unit is configured for collision avoidance in the event of a recognised risk of collision.

The graphics processing unit is preferably configured for real-time image processing and ideally comprises one or more CPUs and/or GPUs. Particularly suitable are highly parallel GPUs with 256 or more cores. Otherwise the same advantages and modifications apply as described above.

It can be provided that the optical sensor system comprises two or at least four cameras, preferably CMOS cameras. The use of CMOS cameras or image acquisition units without image processing enables a very high processing speed, so that sufficient reaction time is available even at high speeds of the laser machining head. With four or more cameras, for example, a better resolution can be achieved and parallax errors can be reduced.

It can further be provided that two cameras are provided, the capture areas of which are aligned in the same direction, and that the capture area of a first camera captures a first half of the machining space and that the capture area of a second camera captures a second half of the machining space. With this arrangement, the shadowing by the laser machining head is reduced since at least one camera always has a free field of view.

It can be provided that four cameras are provided and that the capture areas of two cameras capture a first half of the machining space and that the capture areas of two cameras capture a second half of the machining space, wherein the two cameras are each offset from each other. The combination of both perspectives or both capture areas makes it possible to obtain information about the depth of the observed object. Ideally, cameras are installed on both sides of the cutting area to refine the evaluation.

It can be provided that the camera or the cameras are connected to the graphics processing unit with a high-speed connection. To respond to a critical situation with minimal delay, the high-speed link provides low-latency transmission. In addition, the high-speed connection can bridge a few meters between the cameras and the graphics processing unit. The high-speed connection can comprise, for example, optical fibre, coaxial cable, twisted pair, etc. A new bus for video data is, for example, the FPD link, which is used in vehicles to drive displays. Such links or connections allow a high data transfer rate, for example greater than 1 GHz, for the transmission of many high-resolution images.

It can be provided that the graphics processing unit is connected to the numerical control unit with a real-time Ethernet connection. A real-time Ethernet connection, such as EtherCAT (Ethernet for Control Automation Technology), enables real-time image data availability for real-time processing by the graphics processing unit.

It can further be provided that the camera system and/or the graphics processing unit is configured to perform a first calibration of the intrinsic camera parameters and a second calibration of translation and rotation parameters of a coordinate system of the camera compared to a coordinate system of the laser machining tool. The calibration of the intrinsic camera parameters is complex and not automated. A single pass can be sufficient as long as the lens on the camera is not adjusted. For this calibration, images of for example a chessboard at different angles are needed. The intrinsic parameters are then calibrated with image processing and these images. This calibration creates the software model of the camera and lens. The calibration of the translation and rotation parameters can be repeated with each movement of the camera or the fixtures thereof. This calibration is easy to automate, so it is recommended to periodically recalibrate these parameters. Movements over time are to be expected due to of vibrations or slight thermal deformation of the machine housing. At least four points in the machine coordinate system and on the image must be known for this calibration. For this calibration, a Harris corner of sufficient size can be attached to the cutting head. This Harris corner can be recognised with the cameras and compared with the current cutter head coordinate. Corresponding machine and image coordinates can be determined.

Further preferred embodiments of the invention will become apparent from the remaining features mentioned in the dependent claims.

The various embodiments of the invention mentioned in this application are, unless otherwise stated in the individual case, advantageously combinable with each other.

The invention will be explained below in exemplary embodiments with reference to the accompanying drawings. In the figures:

FIG. 11 shows a flow chart of a general method for collision avoidance of a laser machining head; and FIG. 12 shows an exemplary depiction of shapes of a cutting contour.

Figure 1:
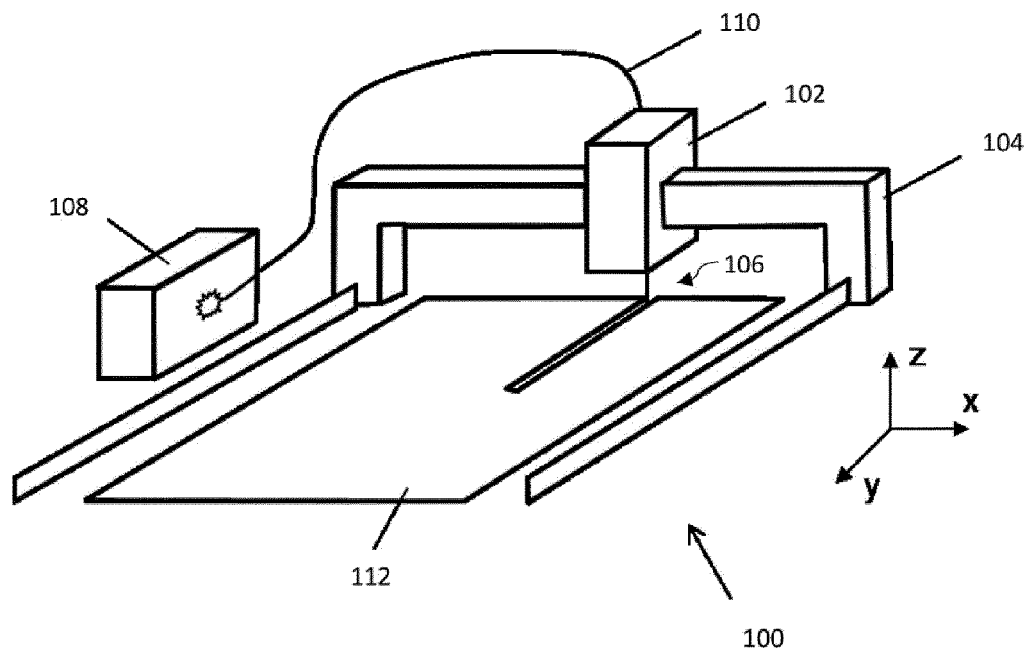
FIG. 1 shows a schematic perspective view of a numerically controlled laser machining tool.

FIG. 1 shows a schematic perspective view of a numerically controlled laser machining tool 100, in particular a laser cutting machine with a laser machining head 102, in particular a laser cutting head. The laser cutting head 102 is arranged on a movable bridge 104 so that it can be moved in at least the x and y directions in a machining space 106 of the laser machining tool 100. A laser source 108 generates laser light and supplies it to the laser cutting head 102 via a light guide 110. A workpiece 112, for example a metal sheet, is arranged in the machining space 106 and is cut by the laser beam.

Figure 2:
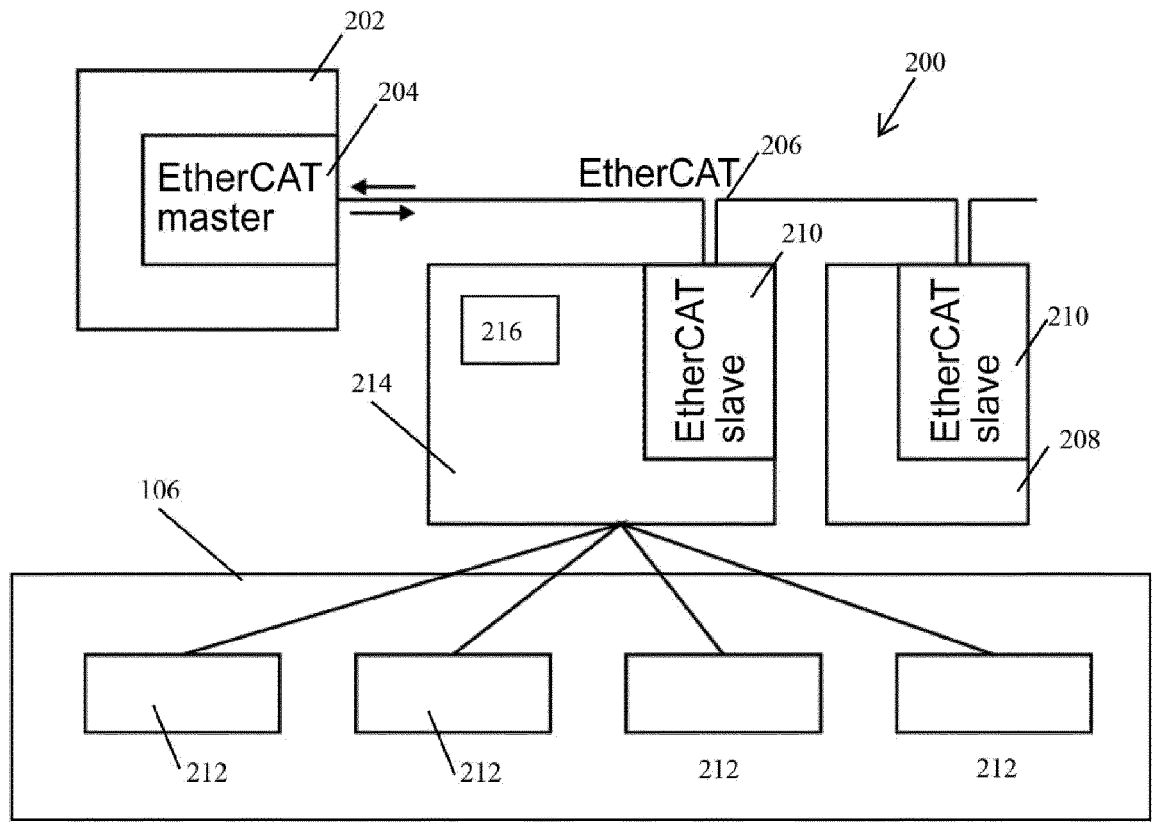
FIG. 2 shows a schematic representation of a control of the numerically controlled laser machining tool of FIG. 1.

FIG. 2 shows a schematic representation of a controller 200 of the numerically controlled laser machining tool 100 from FIG. 1. A numerical control unit 202, also called CNC (Computerised Numerical Control), executes the cutting plan as an EtherCAT master 204 in that the position signals are output via an EtherCAT bus 206 to the drives 208 as EtherCAT slave 210. One of the drives 208 is exemplified as EtherCAT slave 210. This EtherCAT slave 210 and other EtherCAT slaves write data, for example from sensors, such as incremental encoders, to the EtherCAT bus 206, and read data, which for example is used to control outputs, from the EtherCAT 206 bus.

In this example, four cameras 212 are provided, the arrangement of which in the machining space 106 of the numerically controlled laser machining tool will be explained in more detail in the following figures. Preferably, CMOS cameras or image recording units are provided without image processing, which enables a very high processing speed.

The image data of the cameras 212 are forwarded to a graphics processing unit 214 where the processing of the image data takes place. The graphics processing unit 214 preferably comprises a plurality, for example, 512 or more GPUs, and is preferably configured for real-time image processing. Particularly suitable are highly parallel GPUs with 256 or more cores. The graphics processing unit 214 also operates as EtherCAT slave 210 and thus is in direct communication with numerical control unit 202.

The graphics processing unit 214 and/or the numerical control unit 202 are configured to carry out the methods or operations illustrated in FIGS. 6 through 10 and described below. In particular, the graphics processing unit 214 is configured to process data from the cameras 212 to recognise changes to the workpiece, to model a change from a 3D object, and, optionally together with the numerical control unit 202, to check for collision between the 3D object and the laser machining head based on a predetermined one cutting plan and/or the current position of the laser machining head. In addition, the numerical control unit 202 is configured for collision avoidance in the event of a recognised risk of collision.

The graphics processing unit 214 obtains the cutting geometry or trajectory of the laser cutting head from the numerical control unit 202 via the EtherCAT bus 206. Before a collision event occurs, the graphics processing unit 214 can signal this via the EtherCAT bus 206. The signalling can be sent to the numerical control unit 202 and/or directly to the drive(s) 208 for the fastest possible response, such as emergency stop or bypass.

This can be done gradually depending on the time available up to a collision. If there is sufficient time for an evasive manoeuvre, the graphics processing unit 214 sends data, such as the position or coordinates of the collision to the numerical control unit 202, which in turn calculates an evasive route and drives the drives 208 accordingly. The new alternate route is also sent to the graphics processing unit 214, which now continues to check the new route for collision.

If there is insufficient time for an evasive manoeuvre, the graphics processing unit 214 sends emergency stop commands directly to the drives 208 to achieve the fastest possible stop of the laser cutting head.

A computing unit 216 of the graphics processing unit 214 can be realised either by means of a CPU, a graphics processing unit GPU, or a combination of both. The computing unit 216 has enough computing power to evaluate the received camera data in real time and to make a decision as to whether a collision is imminent. This must be done fast enough that the numerical control unit 202 of the machine can take appropriate action to avoid the collision. The computing unit 216 or the graphics processing unit 214 is connected to the numerical control unit 202, for example via the illustrated EtherCAT bus 206.

All elements of the controller 200, in particular the graphics processing unit 214, the cameras 212, and the bus 206, are configured for a real-time capability of the system.

Figure 3:
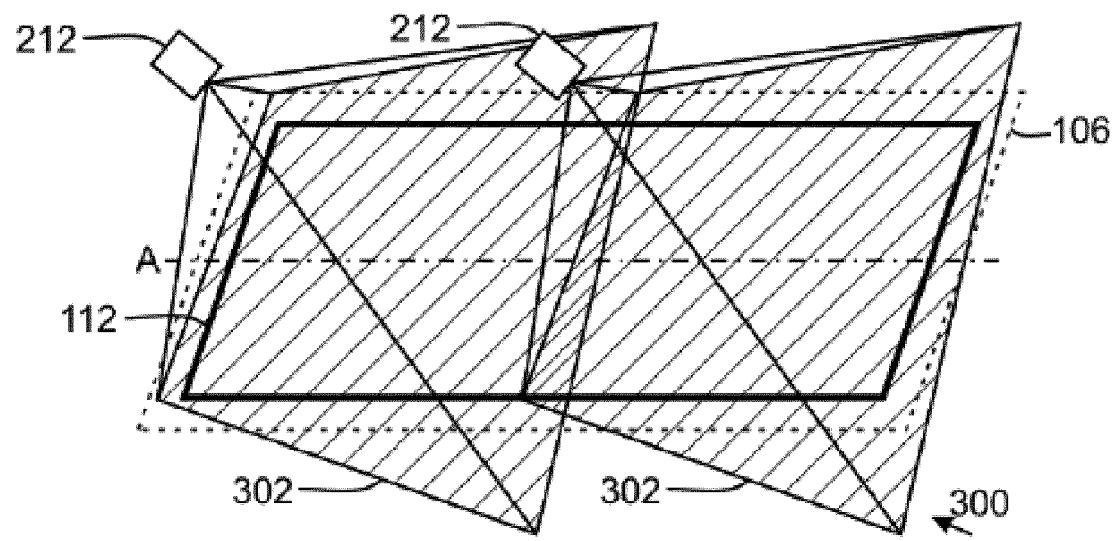
FIG. 3 shows a schematic representation of two cameras of the laser machining tool for capture of the machining space.
Figure 4:
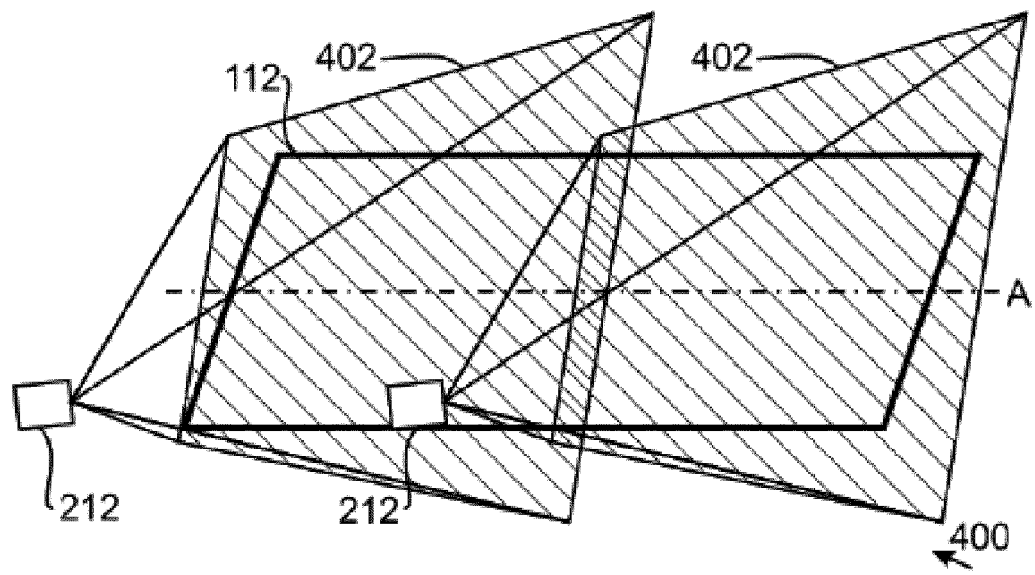
FIG. 4 shows a schematic representation of two other cameras of the laser machining tool for capture of the machining space.
Figure 5:
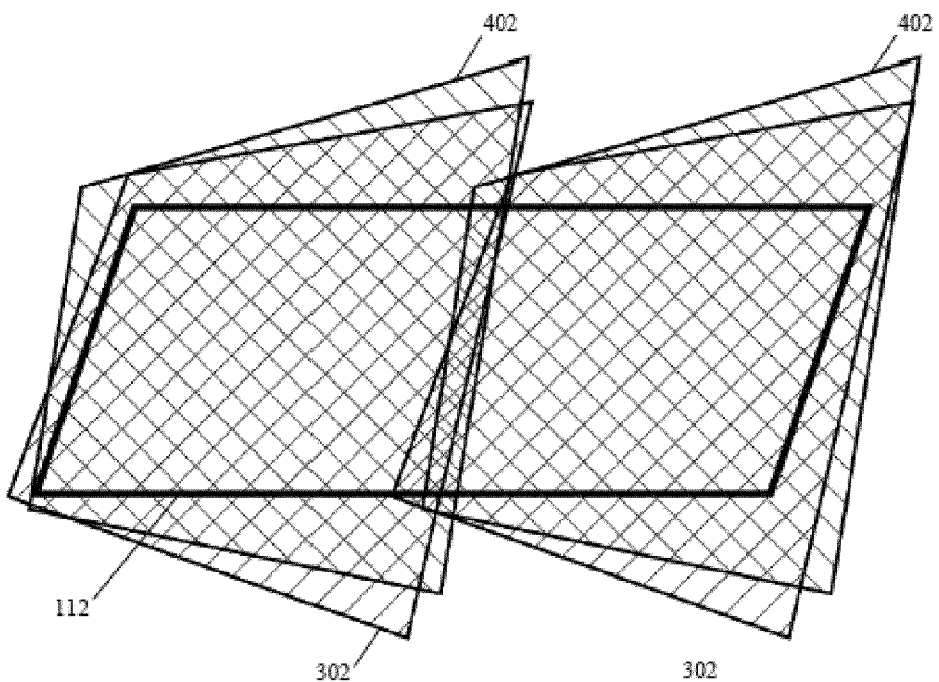
FIG. 5 shows a schematic representation of the capture areas of the four cameras of FIG. 4.

FIGS. 3 through 5 show schematic representations of a camera system 300 of the numerically controlled laser machining tool 100 with at least two cameras 212. In addition to the cameras 212, suitable illuminations, for example LED lights, can be provided to enhance the quality of the camera images.

FIG. 3 shows two cameras 212 for which the capture areas 302 are aligned in the same direction. The capture area 302 of a first camera 212 captures a first half of the workpiece 112 or of the machining space 106. The capture area 302 of a second camera 212 captures a second half of the workpiece 112 or of the machining space 106. Thus, the two cameras capture the entire machining space 106. The two cameras 212 are arranged laterally offset from a longitudinal axis A of the machining space 106, so that the capture areas 302 extend laterally or obliquely into the machining space 106.

FIG. 4 shows a further schematic representation of the camera system 400 of the numerically controlled laser machining tool 100. Here, the two cameras 212 are arranged in a mirrored manner in comparison to the arrangement of FIG. 3 on the longitudinal axis A of the machining space 106. Likewise, the capture areas 402 are inclined and, in comparison to FIG. 3, aligned opposite to the longitudinal axis A. Analogous to FIG. 3, the capture area 402 of a first camera 212 captures a first half of the workpiece 112 or of the machining space. The capture area 402 of a second camera 212 captures a second half of the workpiece 112 or of the machining space.

FIG. 5 shows a further schematic illustration of the camera system 500 of the numerically controlled laser machining tool 100 with the capture areas 302 and 402 of the four cameras (not shown here).

In this example, cameras are installed on both sides of the cutting area or machining area to refine the evaluation. The combination of both viewpoints 302 and 402 provides information about the depth of the observed object. This depth or spatial information enables the modelling of a 3D object from a change in the workpiece 112.

Figure 6:
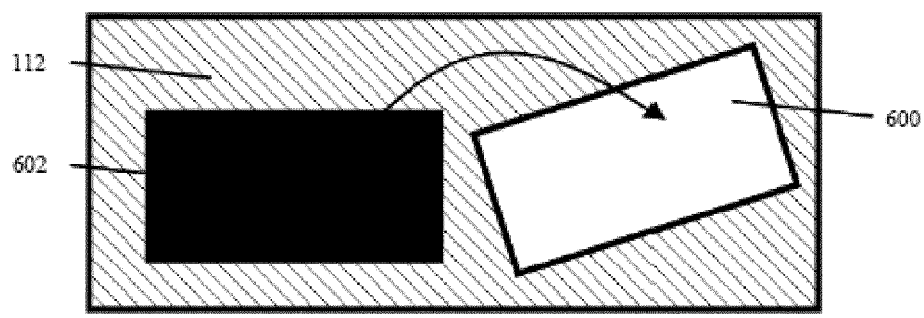
FIG. 6 shows a schematic representation of a flown-away part of a workpiece.

FIG. 6 shows a schematic illustration of a flown-away part or cut part 600 of a workpiece. The cut part 600 shown here is located next to the cutting contour 602, where the cut part 600 was originally located, that is before the cutting. The illustration shown here can be, for example, the shot from a single camera.

Such cut parts 600, which fly away due to the gas pressure and land anywhere on the raw material or the workpiece 112, can be detected in that first a reference depiction of the workpiece 112 is created and then current depictions or shots are continuously compared with the reference depiction. This can be done in particular at the points where the raw material has not yet been processed. If a position or change in the comparisons is classified as critical, the exact position, in particular the height, of the part resting over the workpiece 112 can be determined with a 3D fitting.

As a possible remedy in a critical classification, that is, a potential collision between the cut part 600 and the laser machining head, the flown-away cut part 600 can be blown away with gas pressure, this area will not be cut, or the operation will be discontinued.

Figure 7:
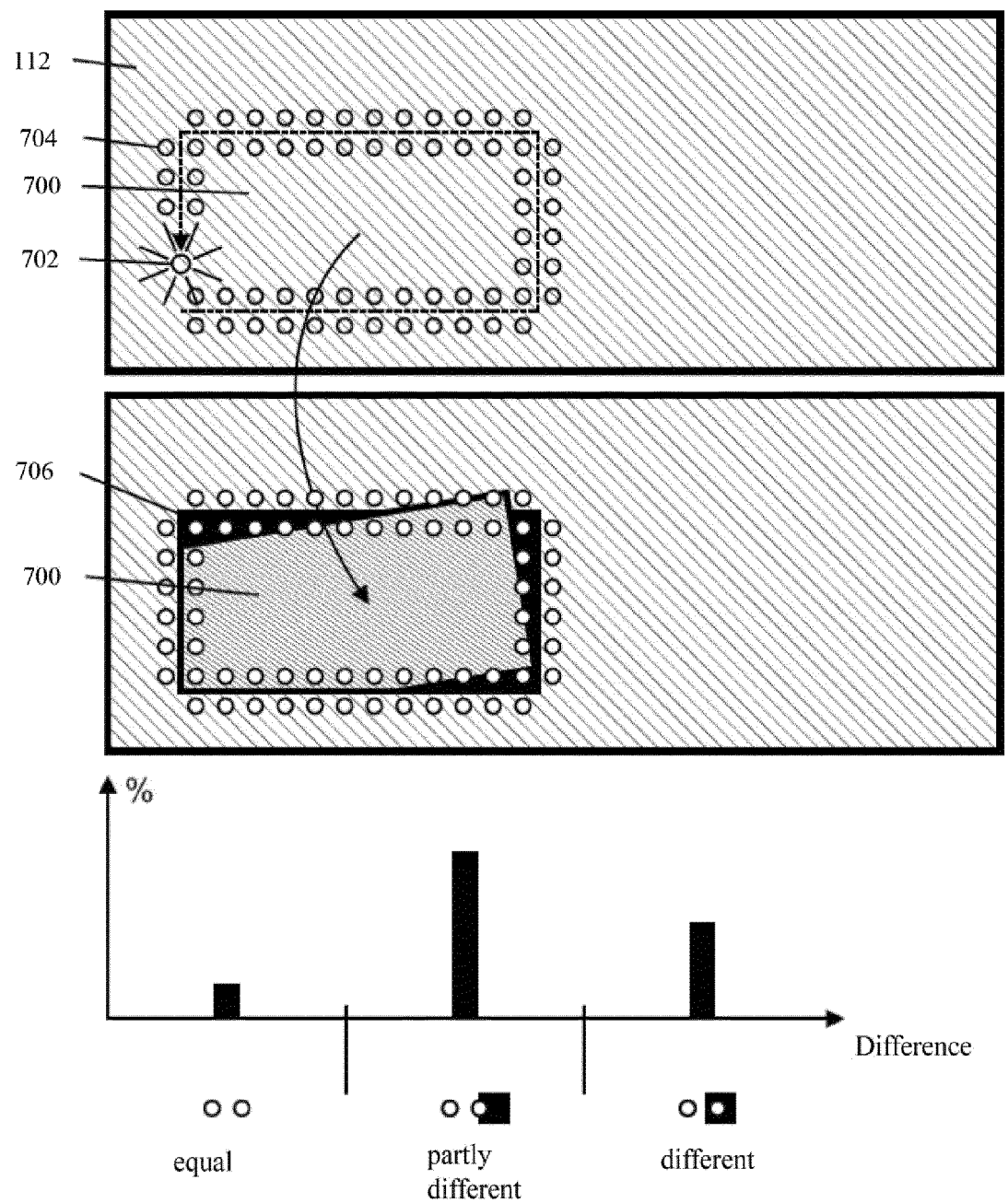
FIG. 7 shows a schematic representation of a cut-out part of a workpiece with measuring points.

FIG. 7 shows a schematic representation of a cut-out part or cut part 700 of a workpiece 112. The two illustrations at the top of FIG. 7 can in turn be shots from one or more cameras. The lowermost illustration in FIG. 7 depicts a colour-along-edges algorithm for detecting a change in an image of the workpiece 112.

For the colour-along-edges algorithm, a very accurate projection of 3D points in the machine coordinate system onto the 2D images is desirable. For this, the cameras 212 must be calibrated. Image processing executed in, for example, the graphics processing unit 214 is used for the calibration and projection. Two different calibrations are performed. The first is the calibration of the intrinsic camera parameters. The second calibration is the calibration of the translation and rotation parameters in the coordinate system of the camera 212 compared to the coordinate system of the machine 100.

The calibration of the intrinsic camera parameters is complex and not automated. A single pass can be sufficient as long as the lens on the camera 212 is not adjusted. For this calibration, images of a chessboard at different angles are needed. The intrinsic parameters are then calibrated with image processing and these images. This calibration creates the software model of the camera and lens.

The calibration of the translation and rotation parameters can be repeated with each movement of the cameras 212 or the fixtures thereof. This calibration is easy to automate, so it is recommended to periodically recalibrate these parameters. Movements over time are to be expected due to of vibrations or slight thermal deformation of the machine housing. At least 4 points in the machine coordinate system and in the image must be known for this calibration.

A Harris corner of sufficient size can be attached to the cutting head as a target for this calibration. This Harris corner can be recognised with the cameras 212 and compared with the current cutter head coordinate. Corresponding machine and image coordinates can be connected.

The target, for example a Harris corner, is preferably attached to the cutting head. This target can be recognised automatically if its approximate position on the image is known. This is the case with a periodic recalibration.

For the calibration process, therefore, the following steps are performed respectively. First, the cutting head is positioned in four defined positions. At each of these positions, one image is taken with each of the two cameras or two viewing angles. On each image, the image coordinates of the Harris corner are determined. From the machine coordinates of the four positions and the image coordinates of the Harris corner, the translation and rotation parameters are calculated.

From the workpiece 112, the cut part 700 is cut out by means of a laser beam 702. This process is observed by the cameras. Measurements are taken at certain measuring points 704 along the sectional contour in an image processing executed in the graphics processing unit 214. The measurement points 704 are used to detect a change in an image of the workpiece 112.

Now, when the cut part 700 tilts, the changes in the amount of light along the contour 706 reaching the camera are detected in the first step. This change in the amount of light occurs through the change in the reflection angle of the cut part 700. This can mean both additional brightness and reduced brightness.

The tilted cut part 700 partially disappears under the remaining workpiece 112, resulting in a strong contrast. Here the contrast is shown as a change between white and black. In fact, changes in colour values, brightness values and/or contrast values can be used.

These changes are analysed and a check is made to see if a threshold to start further processing has been reached. According to the illustration at the bottom of FIG. 7, the difference between the colour value of a measuring point 704 lying within the contour 706 and a point located outside the contour 706 is determined and then evaluated.

If both colour values of the reflected light are the same or have only a very slight deviation, then the cut part 700 is not tilted (FIG. 7, top) or the tilted cut part 700 and the remaining work piece 112 are at about the same height (FIG. 7, middle), such as in the lower left corner of the cut part 700. In this case, there is no risk and the value is below the threshold. Further action is not necessary and monitoring will be continued.

If both colour values are different, then the cut part 700 at these measuring points is no longer within the contour 706 (FIG. 7, centre), for example, in the upper left corner of the cut part 700. In this case, there is also no risk and the value is below the threshold. Further action is not necessary and monitoring will be continued.

If both colour values are partly different, then the cut part 700 is located at these measurement points outside the contour 706 and above the remaining workpiece 112 (FIG. 7, centre), such as in the upper right corner of the cut part 700. In this case, there is a risk of a collision since the cut part 700 rises and the threshold is exceeded.

The threshold for starting the second algorithm is then reached. The second algorithm is called 3D fitting and will be described with reference to FIGS. 8 and 9. In contrast to the colour-along-edges algorithm, in which a change and thus potential risk are quickly recognised, the 3D fitting involves the recognition of whether the corresponding part actually poses a risk to the cutting head and thus for the machining process. It is quite possible that a change is detected, but it does not turn out to be a risk. Such cases do not lead to a stopping of the machining process due to this bifurcation of the algorithm.

Figure 8:
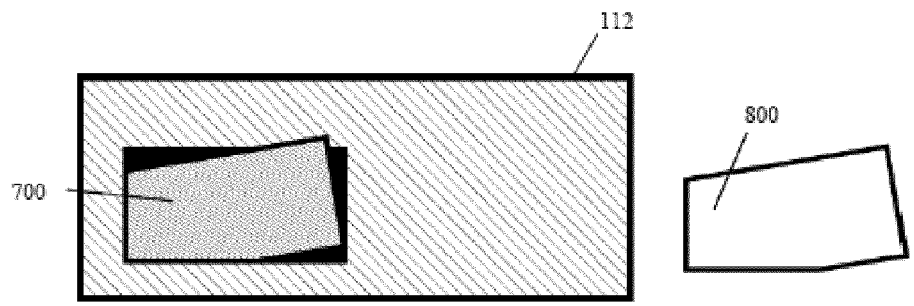
FIG. 8 shows a schematic representation of the cut-out part of FIG. 7 showing the part extracted by image processing.

FIG. 8 shows a schematic representation of the cut-out part of FIG. 7, showing the part extracted by image processing. The contour 800 of the upright cut part 700 in the camera image is determined. For this purpose, subtraction algorithms are used, for example. This determination also takes place in the graphics processing unit 214.

Figure 9:
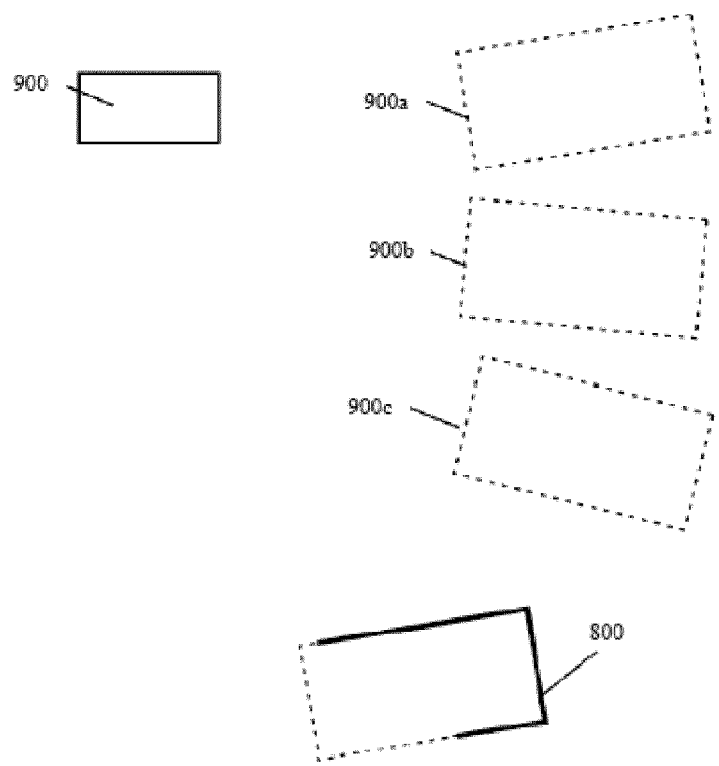
FIG. 9 shows a schematic representation of the matching of the extracted part.

FIG. 9 shows a schematic representation of the matching of the extracted part. The matching or comparison also takes place in the graphics processing unit 214.

From the cutting plan, first the critical cut part 700 which was detected in the colour-along-edge algorithm is selected. In contrast to the camera image (see FIG. 8), the complete contour 900 of the part 700 is obtained from the cutting plan.

A possible matching algorithm works as described below.

The original contour 900 is rotated by the 3D fitting algorithm along one, several, or all three axes. Thus, the contour 900 is modelled in all possible positions in which the cut part 700 can lie. By way of example, the contours 900*a*, 900*b*, and 900*c* are shown here.

This modelling of the contours 900*a*, 900*b*, and 900*c* or the cutting parts can be done before the start of cutting, so that the algorithm is as efficient as possible during testing, since what must be done is only the comparison but not the modelling.

Now, when the information of the model is available and a cut part tilts, the contour 800 of the tilted part 700 recognised by the camera is compared with the models 900*a*, 900*b*, and 900*c*.

The best match between the model and the contour 800 of the tilted part 700 is defined. Here it is the contour 900*a*. From this, it can then be calculated at which position and by how much the part stands upright. Together with the information on where the cutting head will move within the next few seconds, it can be calculated whether or not a collision is possible.

If a collision is possible, the area around the position is marked as a risk zone. Now it must be decided what the control unit should initiate as a countermeasure. The collision can be prevented, for example, by stopping the machine rapidly. The even more efficient solution is that the cutting head either drives around the risk zone, lifts up to avoid the collision, or a combination of both.

Figure 10:
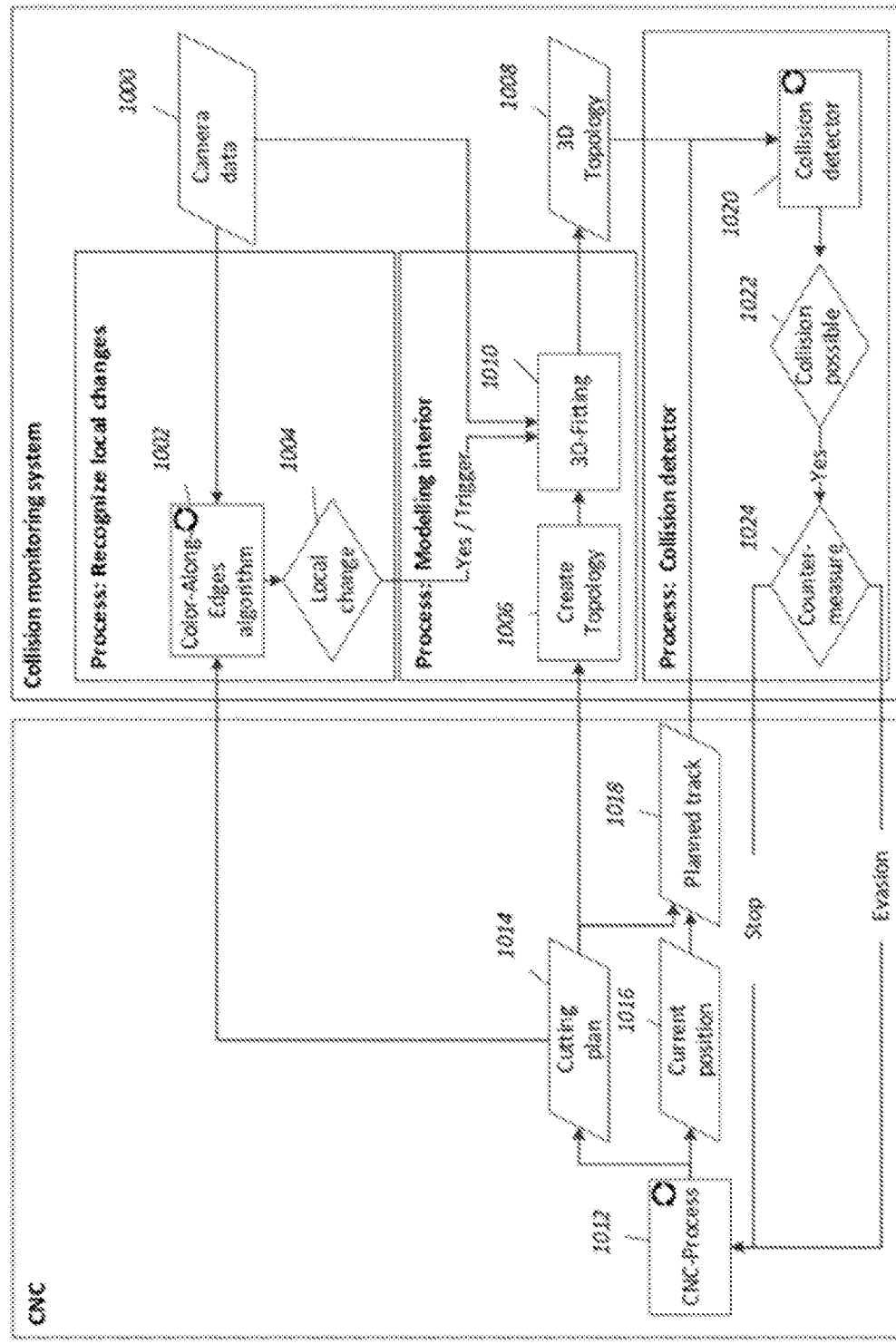
FIG. 10 shows a flowchart of a method for collision avoidance of a laser machining head.

FIG. 10 shows a flow chart of a method for collision avoidance by a laser machining head in a machining space of a laser machining tool.

In a first step 1000, camera data are generated, i.e., images of the workpiece with at least one optical sensor, preferably two, four, or more sensors.

In a second step 1002, changes are detected in an image of the workpiece by means of a previously described colour-along-edges algorithm. If a local change is detected in step 1004, the method proceeds to block 1010. If not, then branching back to the monitoring in step 1002 results in a monitoring loop. This algorithm detects local changes in cut parts or the like, and not global changes, such as feeding or removing a workpiece. The two steps 1002 and 1004 are part of a local change recognition process.

The numerical control process 1012 is executed in the numerical control unit. The numerical control unit knows the cutting plan 1014 and the current position 1016 of the cutting head, and in step 1018 calculates the planned track or route of the cutting head from the given cutting plan 1014 and/or the current position of the laser machining head.

The cutting plan 1014 is supplied to a process for modelling the interior space or the machining space. This process, as well as the local change recognition process, operates in the collision monitoring system formed in or executed by the graphics processing unit.

The block 1006 of the interior modelling process is supplied with the cutting plan 1014. A topology of the interior or the workpiece to be machined is created from the cutting plan 1014. The topology comprises the workpiece as well as the cutting pattern planned on the workpiece and can comprise the respective circumferences and locations of the cut parts. This topology is supplied to block 1010.

In block 1010, the 3D fitting is carried out, that is to say the modelling of a 3D object of the change, as described above. For this purpose, the camera data 1000 is supplied to the block 1010. The 3D fitting is started when a local change is detected in block 1004. As the output of the modelling, a 3D topology 1008 of the change is provided, such as a contour 800.

This 3D topology 1008, like the planned track 1018, is supplied to a process collision detector. This process is formed in or executed by the graphics processing unit.

The 3D topology 1008 and the planned track 1018 are supplied to a collision detector 1020, an algorithm in the graphics processing unit, and/or the numerical control unit 1012. The collision detector 1020 checks to see if the 3D topology 1008 is within the planned track. If it is determined in step 1022 that a collision is possible, the method proceeds to block 1024. If not, then branching back to the monitoring in step 1002 (not shown) results in a monitoring loop. The block or step 1002 is executed continuously.

In step 1024, a countermeasure is taken by driving the laser machining head for collision avoidance in the event of a recognised risk of collision. The countermeasure is a stop and/or evasion of or bypassing the obstacle. Blocks 1020, 1022, and 1024 are part of the collision detector process.

The result of step 1024 is supplied to the CNC process 1012 for processing and implementation. For example, for an emergency stop, the drives of the laser machining head can also be controlled directly, that is without the involvement of the numerical control unit.

FIG. 11 shows a flow chart of a general method for collision avoidance of a laser machining head. In a first step 1100, the entire cutting area or the entire machining space is continuously monitored by the sensor system.

Checks for a local change as stated above are also made continuously in step 1101. A local change is usually caused by a cutting process. If there is no local change, branching back to step 1100 results in a monitoring loop.

If a local change is recognised, the method proceeds to step 1102 where the change is analysed as outlined above.

FIG. 12 shows an exemplary depiction of shapes of a cutting contour like the cutting contour 602 of FIG. 6. For the cutting contour, the system calculates four sets of points, called shapes 1200, 1202, 1024, and 1206. The shapes 1200, 1202, 1204, and 1206 may be arranged on an image of the workpiece or the cutting contour.

A first shape 1200 consists of points lying on the actual cutting line. A second shape 1202 consists of a trace of points inside the cutting contour, at an offset of five mm. A third shape 1204 consists of a trace of points outside the cutting contour, also at an offset of for example five mm. A fourth shape 1206 covers the whole area inside of the cutting contour.

Image pixels of the four shapes 1200, 1202, 1204, and 1206 are extracted from the image. In a normalization step, histograms of pixel brightness are calculated for each of the four shapes 1200, 1202, 1024, and 1206. Each histogram has for example 32 bins. In addition, a co-occurance histogram is calculated for the second shape 1202 and the third shape 1204 three. This co-occurance or 2D histogram includes 32 by 32 bins and puts the brightness of corresponding points inside and outside of the cut in correlation. The x axis of the 2D histogram may be the second shape 1202 and the y axis of the 2D histogram may be the third shape 1204.

Then, concatenation of this input data into a vector is calculated. The size of the vector differs for the Neural network for two cameras and the Neural network for one camera.

The Neural network accepts input data as a vector containing the concatenated histograms. For the Neural network that predicts contours visible by two cameras, the following sequence is used:
Shape 1200 histogram from right camera (32 values)
Shape 1200 histogram from left camera (32 values)
Shape 1202 histogram from right camera (32 values)
Shape 1202 histogram from left camera (32 values)
Shape 1204 histogram from right camera (32 values)
Shape 1204 histogram from left camera (32 values)
Shape 1206 histogram from right camera (32 values)
Shape 1206 histogram from left camera (32 values)
Co-occurance histogram from right camera (32×32=1024 values)
Co-occurance histogram from left camera (32×32=1024 values)

This totals up to 2304 input values for the Neural network.

For the Neural network that predict contours visible only by one camera, the sequence is as follows:
Shape 1200 histogram (32 values)
Shape 1202 histogram (32 values)
Shape 1204 histogram (32 values)
Shape 1206 histogram (32 values)
Co-occurance histogram (32×32=1024 values)

This totals up to 1152 input values for the Neural network.

The Neural network is in this example a deep Neural network consisting of one flattening layer as input layer, five internal dense layers with batch normalization and one dense layer with sigmoid activation as output layer.

From the normalized and concatenated input data, the deep Neural network outputs one floating point value in the range from 0,0 to 1,0 per contour. If the value is below 0,5, the contour is predicted to be safe. If the value is 0,5 or above, the contour is predicted to be dangerously tilted.

In FIG. 10 showing a flowchart of a method for collision avoidance of a laser machining head, the above described implementation of the Neural network may replace the interior modelling (steps 1006 and 1010) and the step 1008. Alternatively, the above described implementation of the Neural network may replace the recognition of local changes (steps 1002 and 1004), the interior modelling (steps 1006 and 1010), and the step 1008.

The method presented here for collision avoidance by a laser machining head in a machining space of a laser machining tool enables a simple and precise recognition of possible obstacles in the planned track in real time and a collision avoidance in case of recognised risk of collision.

The invention claimed is:

1. A method for collision avoidance of a laser machining head in a machining space of a laser machining tool, having the steps of:
    monitoring a workpiece in the machining space with at least one optical sensor;
    capturing images of the workpiece, including a first image captured at a first time and a second image captured at a second time that is different from the first time;
    detecting a change between the first image and the second image of the workpiece;
    recognizing whether the detected change comprises an object, having a predetermined shape according to a predetermined cutting plan, cut from the workpiece is tilted with at least a portion of the object standing upright relative to the workpiece;
    checking for a collision between the upright portion of the object and the laser machining head based on the predetermined cutting plan and/or the current position of the laser machining head; and
    controlling drives to move the laser machining head for collision avoidance in case of recognizing a risk of collision.

2. The method according to claim 1, wherein measuring points are defined along a cutting contour of a cut part and monitored for brightness and/or colour values.

3. The method according to claim 1, wherein the images are captured offset in time and that the detected change in the images of the workpiece is detected by comparing the second image to the first image, which is a chronologically earlier image of the workpiece.

4. The method according to claim 1, wherein a 3D object of the change is modeled and is checked for collision between the 3D object and the laser machining head.

5. The method according to claim 1, further comprising:
    calculating at least two shapes consisting of points and located parallel to a border of a cutting contour in an image, wherein one shape is located inside the border and one shape is located outside the border;
    extracting image pixels according to the points of the shapes;
    normalizing the image pixels by calculating a histogram of pixel brightness for each shape;
    inputting the histograms into a deep neural network comprising an input layer, a plurality of internal layers and an output layer;
    processing the histograms with the deep neural network;
    outputting a variable by the deep neural network; and
    recognizing whether the object in the cutting contour is tilted for a value of the variable being on a first side of a threshold or whether an object in the cutting contour is not tilted for a value of the variable being on a second side of a threshold.

6. The method according to claim 5, wherein two further shapes are calculated, wherein a first further shape is located on the cutting contour and a second further shape covers the whole area inside the cutting contour.

7. The method according to claim 5, wherein before the step of extracting image pixels, image pixels that are not covered by parts of the laser machining tool are determined, for the determination a dynamic 3D model of the parts of the laser machining tool is provided and updated with live coordinates from the laser machining tool, the visible, to be extracted, image pixels are calculated by comparison of the dynamic 3D model with the images.

8. The method according to claim 5, wherein the step of normalizing the image pixels further includes calculating a 2D histogram for the at least two shapes.

9. The method according to claim 1, wherein the recognition is based on already pre-calculated possible positions of cut parts of the workpiece.

10. The method according to claim 1, wherein a cut part is identified and compared with a position of the cut part with already calculated possible positions of this cut part.

11. The method according to claim 1, wherein, when the collision between the upright object and the laser machining head is anticipated, a trajectory of the laser machining head is driven to bypass the detected change or to stop.

12. A method for collision avoidance of a laser machining head in a machining space of a laser machining tool, having the steps of:
    monitoring a workpiece in the machining space with at least one optical sensor;
    capturing images of the workpiece, including a first image captured at a first time and a second image captured at a second time that is different from the first time;
    detecting a change between the first image and the second image of the workpiece;
    recognizing whether the detected change comprises an object standing upright relative to the workpiece;
    checking for a collision between the upright object and the laser machining head based on a predetermined cutting plan and/or the current position of the laser machining head;
    controlling drives to move the laser machining head for collision avoidance in case of a recognized risk of collision;
    calculating at least two shapes consisting of points and located parallel to a border of a cutting contour in an image, wherein one shape is located inside the border and one shape is located outside the border;
    extracting image pixels according to the points of the shapes;
    normalizing the image pixels by calculating a histogram of pixel brightness for each shape;
    inputting the histograms into a deep neural network comprising an input layer, a plurality of internal layers and an output layer;
    processing the histograms with the deep neural network;
    outputting a variable by the deep neural network; and
    recognizing whether an object in the cutting contour is tilted for a value of the variable being on a first side of a threshold or whether an object in the cutting contour is not tilted for a value of the variable being on a second side of a threshold.

13. The method according to claim 12, wherein two further shapes are calculated, wherein a first further shape is located on the cutting contour and a second further shape covers the whole area inside the cutting contour.

14. The method according to claim 12, wherein before the step of extracting image pixels, image pixels that are not covered by parts of the laser machining tool are determined, for the determination a dynamic 3D model of the parts of the laser machining tool is provided and updated with live coordinates from the laser machining tool, the visible, to be extracted, image pixels are calculated by comparison of the dynamic 3D model with the images.

15. The method according to claim 12, wherein the step of normalizing the image pixels further includes calculating a 2D histogram for the at least two shapes.

\* \* \* \* \*